United States Patent [19]
Perez-Albuerne
[11] 3,754,986
[45] Aug. 28, 1973

[54] ORGANIC SEMICONDUCTORS

[75] Inventor: Evelio A. Perez-Albuerne, Rochester, N.Y.
[73] Assignee: Eastman Kodak Company, Rochester, N.Y.

[22] Filed: Apr. 23, 1971
[21] Appl. No.: 137,059

Related U.S. Application Data

[62] Division of Ser. No. 851,088, Aug. 18, 1969, Pat. No. 3,634,336.

[52] U.S. Cl. .................. 117/201, 117/62, 117/62.1, 117/69, 117/106, 117/215, 96/1 R, 96/88, 252/500, 252/519, 260/327 C
[51] Int. Cl. ............................................ H01b 1/06
[58] Field of Search ........................... 252/519, 500; 117/201, 215, 62.1, 71 R, 106, 139.5 CB, 69, 62; 260/327 C; 96/1 R, 88

[56] References Cited

UNITED STATES PATENTS 3,403,165 9/1968 Matsunago......................... 252/500

*Primary Examiner*—Alfred L. Leavitt
*Assistant Examiner*—M. F. Esposito
*Attorney*—William H. J. Kline et al.

[57] ABSTRACT

Organic semiconductors are described having an electron donating cation which is a Group VI*a* element derivative of a polycyclic aromatic hydrocarbon and an inorganic or organic electron-accepting anion. These materials are generally soluble in ordinary solvents and have resistivities between $10^{-3}$ and $10^{9}$ ohm-cm. They are useful in conducting coatings, fibers, etc.

14 Claims, No Drawings

ORGANIC SEMICONDUCTORS

This is a division of U.S. Patent application, Ser. No. 851,088 now U.S. Pat. No. 3,634,336, Organic Semiconductors, filed Aug. 18, 1969.

This invention relates to novel semiconducting organic materials, elements and compositions containing these materials, and to methods for their preparation and use.

The usefulness of semiconducting organic materials is associated to a large extent with a combination of properties such as 1) desirable electronic properties (e.g., low electrical resistivity), 2) chemical stability, and 3) physical and chemical properties which would permit the preparation of useful articles of manufacture. The first two properties mentioned above are shared by a number of inorganic materials well known in the art, such as metals (e.g., silver, copper) or inorganic semiconductors (e.g., germanium, silicon). However, the great chemical versatility of organic molecules gives the organic semiconductors a distinct advantage over inorganic materials to the extent that it is possible to introduce and modify physical and chemical properties such as solubility, melting point, etc., by relatively minor changes in the chemical structure of the organic molecules. In other words, the organic semiconductors open the possibility for tailor-made electrically-conducting materials with properties not found in inorganic substances.

The preparation of organic materials showing appreciable electrical conductivity has been the subject of several publications and reviews. They may be classified in four broad groups:

1. Non-complex organic semiconductors, consisting of single monomeric species. (The term "semiconductor" as used herein describes electrically conducting materials with a resistivity in the range $10^{-3}$ to $10^9$ ohm-cm.)

2. Complex organic semiconductors, consisting in general of at least two monomeric species (comprising an electron donor moiety and an electron acceptor moiety, respectively.) associated to a certain extent through charge transfer.

3. Non-complex polymeric organic semiconductors.

4. Complex organic semiconductors where at least one of the electron donor moieties or the electron acceptor moieties is attached to, or part of, a polymeric chain. Most of the known organic semiconductors, showing resistivity values lower than $10^4$ ohm-cm, belong to the second and fourth categories, but many of these are unstable under ambient conditions, hence reducing their usefulness considerably. Furthermore, those which show reasonable stability are usually obtained in the form of insoluble, infusable powders, which in general are not amenable to fabrication into useful articles of manufacture. The prior art has not generally been successful in utilizing one of the most unique properties of organic materials in semiconductor technology, namely, the opportunity provided by the versatility of organic molecules, to obtain desirable physical and chemical properties not found in known inorganic semiconductors.

In more recent publications (e.g., Y. Matsunaga, J. Chem. Phys. 42, 2248 (1965) and Y. Okamoto, S. Shah, and Y. Matsunaga, J. Chem. Phys., 43, 1904 (1965)) new organic semiconductors of low resistivity have been described in which a sulfur-containing polycyclic hydrocarbon (tetrathiotetracone) acts as electron donor in dative-type charge transfer complexes with any one of three organic acceptors: o-chloranil, o-bromanil and tetracyanoethylene. (The term "dative-type charge transfer complex" describes a charge transfer complex between an electron donor and an electron acceptor in which the constituents are in an ionized form in the ground state of the complex.) These complexes may also be designated by the term "ion-radical salts," the electron donor becoming the "cation-radical" and the acceptor becoming the "anion-radical." The described complexes, however, lack solubility in organic solvents as well as in water. Likewise, tetrathiotetracene itself, although showing one of the lower electrical resistivities of the non-complex organic semiconductors reported (specific resistivity of the compressed powder is of the order of $10^4$ ohm-cm), is only very slightly soluble at room temperature in a few very strong organic solvents. None of the aforementioned organic semiconductors has sufficient solubility of itself to permit ready fabrication of coatings, free films, fibers, etc.

It is therefore an object of this invention to provide a novel class of organic semiconductors.

It is a further object of this invention to provide semiconductor elements containing the novel organic semiconductors described herein.

It is yet another object to provide processes for preparing semiconductor elements containing the novel organic semiconductors described herein.

It is still a further object to provide compositions containing the novel organic semiconductors described herein.

These and other objects are accomplished with an organic semiconductor having an electron donating moiety (including a cation-radical derived therefrom) which is derived from a polycyclic aromatic hydrocarbon having at least two positions joined by a bridge containing two to four atoms of a Group VI*a* element (e.g., sulfur, selenium, tellurium, etc.), and an electron acceptor moiety (including an anion derived therefrom) which is either inorganic or organic. The complex can also contain combined neutral species of the material from which the cation is derived. The polycyclic aromatic hydrocarbon generally contains two to six fused rings.

The semiconducting materials described herein have specific resistivity values in the range from about $10^{-3}$ to $10^9$ ohm.-cm, and generally are extremely stable even when subjected to severe conditions of heat, pressure, vacuum, etc. Their special utility results from the fact that these materials take advantage of the unique properties of organic molecules and incorporate solubility characteristics, absent in the previously known organic semiconductors, which render them particularly useful for a number of applications. These applications can be in the field of conducting coatings, fibers, free films, etc.

Even though the above-described materials are ion radical salts, the conduction mechanism is electronic (i.e., charge carriers are electrons and/or positive holes) as opposed to the ionic conduction observed in ordinary salts (where charge carriers are migrating ionized species). The conduction, being electronic in nature, is therefore independent of relative humidity, and also occurs in high vacuum.

Novel manufactures made from the organic semiconductors of the type described herein include semiconductor elements which are humidity independent electrically conducting coatings on various support surfaces such as films, fibers, etc., and also electrically conducting free films, conducting fibers and conducting molded objects. Additionally, the semiconductor complexes may be used in a powder form or as pressed pellets. They may be employed in passive electronic components such as resistors or capacitors or in active electronic components such as rectifiers and transistors, or in any element in which their semiconducting properties are useful.

The semiconductors of this invention have the following formula:

$$(D)_k^\circ \, (D^{+n})_m \, (Z^{-p})_q$$

wherein:

D represents a fused polycyclic aromatic hydrocarbon moiety containing two to six fused aromatic rings having at least two positions joined by a bridge containing two to four atoms of a Group VI*a* element such as sulfur, selenium, tellurium, etc. (Handbook of Chemistry and Physics, 38th edition, pp. 394–95), including substituted polycyclic aromatic hydrocarbons containing such bridges such as a tetrathiotetracene moiety, a hexathiopentacene moiety, a tetraselenotetracene moiety, a hexaselenopentacene moiety, a tetratellurotetracene moiety, a hexatelluropentacene moiety, etc., wherein each of the above-described moieties include substituted as well as unsubstituted forms, typical substituents being in the aromatic nucleus and including one or more alkyl groups, aryl groups, alkoxy groups, hydroxy groups, carboxy groups, halogen groups, amino groups, acyl groups, aryloxy groups, nitro groups, sulfo groups, thiol groups, etc.;

Z represents one or more electron accepting anions including a. inorganic anions such as iodide, thiocyanates, fluoroborate, ferricyanide, molybdate, tungstate, etc.;

b. monomeric organic anions derived from monomeric organic acids such as aromatic carboxylic acids, e.g., benzoic, phthalic, terephthalic, pyromellitic, gallic, naphthoic, naphthalene dicarboxylic, naphthalene tetracarboxylic, etc.; aliphatic monocarboxylic acids such as acetic, dichloroacetic, propionic, methoxyacetic, butyric, etc.: aliphatic dicarboxylic acids such as oxalic, malonic, succinic, glutaric, etc.; aliphatic polycarboxylic acids such as citric acid; unsaturated carboxylic acids such as acrylic, maleic, fumaric, muconic, acetylenedicarboxylic, etc.; sulfonic acids such as sulfonic, p-toluene sulfonic, naphthalene sulfonic, naphthol disulfonic, methyl sulfonic, etc.; heterocyclic acids wherein the heterocyclic nucleus contains five to six atoms including one or more nitrogen, oxygen or sulfur atoms such as barbituric, cyanuric, thiobarbituric, quinolinic, chelidonic, etc.;

c. polymeric anions derived from anion-furnishing organic polymers such as poly(vinyl methyl ether-maleic anhydride), polyacrylic acid, sulfonated polystyrene, poly(methyl methacrylate-methacrylic acid), poly(ethyl acrylate-acrylic acid), poly-lethylenemaleic acid,) etc.;

$-p$ is the formal negative charge on each of the Z anions present;

$q$ is the number of Z anions present;

$(D)^\circ$ represents a combined neutral D moiety;

$n$ is the formal positive charge on each D cation:

$m$ represents the number of D cations present; and $k$ represents the number of (D) neutral moieties present. In the above formula Z can be the same or different anions, $-p$ being the charge on each one of the anions. Of course, $-p$ and $q$ can be different for each of the anions when a mixture of anions is present. When Z is an inorganic anion or a monomeric organic anion drived from a monomeric organic acid, $p$ is typically an integer from 1 to 6. When Z is a polymeric anion derived from anion-furnishing organic polymers, $p$ can be 100 or greater depending on the number of anion centers present in the polymer clain which, in turn, is dependent upon the molecular weight of the polymer. The numbers of Z anions present, $q$, generally can be from 1 to about 6. The number of $D^{+n}$ cations, $m$, generally ranges from 1 to about 6, and can be a mixture of different cation species derived from various polycyclic aromatic hydrocarbon materials. The formal positive charge on each D cation, $+n$, can be from 1 to 6. The number of $D^\circ$ combined neutral moieties, $k$ is generally from zero to about 5, and not necessarily an integer. $D^\circ$ can also be a mixture of neutral polycyclic aromatic hydrocarbon moieties. The complexes described herein are electrically balanced so that $nm$ is equal to $pq$. When a mixture of cations and/or anions is present, each of these expressions stands for the sum of such products over all the moieties present. The total number of D moieties present is equal to $(m + k)$. The cation or neutral species of the above formula are preferably derived from compounds having one of the following formulae:

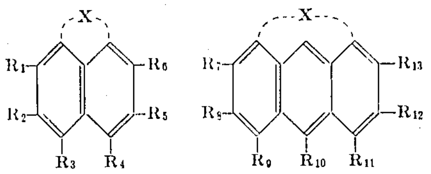

I II wherein:

X represents a bridge containing 2 to 3 sulfur, tellurium, or selenium atoms;

$R_1$ through $R_{13}$ represent any of the following:

a. a hydrogen atom, b. an alkyl group having one to 18 carbon atoms, e.g., methyl, ehtyl, propyl, butyl, isobutyl, octyl, dodecyl, etc., including a substituted alkyl group having one to 18 carbon atoms such as a. alkoxyalkyl, e.g., ethoxypropyl, methoxybutyl, propoxymethyl, etc., b. aryloxyalkyl, e.g., phenoxyethyl, naphthoxymethyl, phenoxypentyl, etc., c. aminoalkyl, e.g., aminobutyl, aminoethyl, aminopropyl, etc., d. hydroxyalkyl, e.g., hydroxypropyl, hydroxyoctyl, hydroxymethyl, etc., e. aralkyl, e.g., benzyl, phenylethyl, etc., f. alkylaminoalkyl, e.g., methylaminopropyl, methylaminoethyl, etc., and also including dialkylaminoalkyl, e.g., diethylaminoethyl, dimethylaminopropyl, propylaminooctyl, etc., g. haloaminoalkyl, e.g., dichloroaminoethyl, N-chloro-N-ethylaminopropyl, bromoaminohexyl, etc., h. arylaminoalkyl, e.g., phenylaminoalkyl, diphenylaminoalkyl, N-phenyl-N-ethylaminopentyl, N-phenyl-N-chloroaminohexyl, naphthylaminomethyl, i. nitroalkyl, e.g., nitrobutyl, nitroethyl, nitropentyl, etc., j. cyanoalkyl, e.g., cyanopropyl, cyanobutyl, cyanoethyl, etc., k. haloalkyl, e.g., chloromethyl, bromopentyl, chlorooctyl, etc., l. alkyl substituted with an acyl group having the formula $$-\overset{\overset{O}{\|}}{C}-R$$

wherein R is hydroxy, halogen, e.g., chlorine, bromine, etc., hydrogen, aryl, e.g., phenyl, naphthyl, etc., lower alkyl having one to eight carbon atoms, e.g., methyl ethyl, propyl, etc., amino including substituted amino, e.g., diloweralkylamino, lower alkoxy having one to eight carbon atoms, e.g., butoxy, methoxy, etc., aryloxy, e.g., phenoxy, naphthoxy, etc.;

c. an aryl group, e.g., phenyl, naphthyl, anthryl, flourenyl, etc., including a substituted aryl group such as a. alkoxyaryl, e.g., ethoxyphenyl, methoxyphenyl, propoxynaphthyl, etc., b. aryloxyrayl, e.g., phenoxyphenyl, naphthoxyphenyl, phenoxynaphthyl, etc., c. aminoaryl, e.g., aminophenyl, aminoaphthyl, aminoanthryl, etc., d. hydroxyaryl, e.g., hydroxyphenyl, hydroxynaphthyl, hydroxyanthryl, etc., e. biphenylyl, f. alkylaminoaryl, e.g., methylaminophenyl, methylaminonaphthyl, etc., and also including dialkylaminoaryl, e.g., diethylaminophenyl, dipropylaminophenyl, etc., g. haloaminoaryl, e.g., dichloroaminophenyl, N-chloro-N-ethylaminophenyl, bromoaminophenyl, etc., h. arylaminoaryl, e.g., phenylaminophenyl, diphenylaminophenyl, N-phenyl-N-ethylaminophenyl, N-phenyl-N-chloroaminophenyl, naphthylaminophenyl, etc., i. nitroaryl, e.g., nitrophenyl, nitroanaphthyl, nitroanthryl, etc., j. cyanoaryl, e.g., cyanophenyl, cyanonaphthyl, cyanoanthryl, etc., k. haloaryl, e.g., chlorophenyl, bromophenyl, chloronaphthyl, etc., l. aryl substituted with an acyl group having the formula $$-\overset{\overset{O}{\|}}{C}-R$$

wherein R is hydroxy, halogen, e.g., chlorine, bromine, etc., hydrogen, aryl, e.g., phenyl, naphthyl, etc., amino including substituted amino, e.g., diloweralkylamino, lower alkoxy having one to eight carbon atoms, e.g., butoxy, methoxy, etc., aryloxy, e.g., phenoxy, naphthoxy, etc., lower alkyl having one to eight carbon atoms, e.g., methyl, ethyl, propyl, butyl, etc., m. alkaryl, e.g., tolyl, ethyl phenyl, propyl naphthyl, etc.;

d. a 2 to 3 membered sulfur, selenium or tellurium bridge joining together any two positions represented by $R_1$ through $R_{13}$;

e. an aryloxy group e.g., phenoxy, naphthoxy, etc.;

f. a halogen atom e.g. bromine, iodine, etc;

g. an alkoxy group having one to eight carbon atoms such as butoxy, methoxy, etc.;

h. a nitro group;

i. a sulfo group;

j. a thiol group;

k. a substituted sulfonyl group;

l. a substituted sulfinyl group;

m. a hydroxy group;

n. a cyano group;

o. an amino group having the formula $$-N\begin{matrix}\diagup R_{14}\\ \diagdown R_{15}\end{matrix}$$

wherein $R_{14}$ and $R_{15}$ are the same or different including hydrogen, lower alkyl having one to eight carbon atoms such as ethyl, propyl, butyl, etc., aryl such as phenyl, naphthyl, etc., halogen e.g. chlorine, bromine, etc.;

p. substituted acyl such as those having the formula $$-\overset{\overset{O}{\|}}{C}-R_{16}$$

where $R_{16}$ is hydroxy, halogen e.g. chlorine, bromine, etc., hydrogen, aryl e.g. phenyl, naphthyl, etc., amino including substituted amino e.g. diloweralkylamino, lower alkoxy having one to eight carbon atoms e.g. butoxy, methoxy, etc., aryloxy e.g. phenoxy, naphthoxy, etc., alkyl e.g., methyl, ethyl, propyl, etc. or q. positions of bonding for additional fused aromatic nuclei which may further be substituted by any of the substituents set forth in a) through p) above.

Typical compounds defined by I and II above are set forth in the following Table I.

TABLE I 1. 1,8 Dithionaphthalene
2. 1,8;4,5 Tetrathionaphthalene
3. 1,9 Dithioanthracene
4. 1,9;5,10 Tetrathioanthracene
5. 1,9;4,10 Tetrathioanthracene
6. 1,10 Dithiopyrene
7. 1,10;5,6 Tetrathiopyrene
8. 1,10;2,3 Tetrathiopyrene
9. 1,10;2,3;5,6 Hexathiopyrene
10. 1,10;2,3;5,6;7,8 Octathiopyrene
11. 3,4 Dithioperylene
12. 3,4;9,10 Tetrathioperylene
13. 5,6 Dithiotetracene
14. 5,6;11,12 Tetrathiotetracene
15. Hexathioanthracene 15.
16. Hexathiopentacene
17. Trithioanthracene
18. Trithiopentacene
19. 1,8 Diselenonaphthalene
20. 2,8,4,5 Tetraselenonaphthalene
21. 1,9 Diselenoanthracene
22. 1,9;5,10 Tetraselenoanthracene 23. 1,10 Diselenopyrene
24. 1,10;5,6 Tetraselenopyrene
25. 1,10;2,3 Tetraselenopyrene
26. 1,10;2,3;5,6 Hexaselenopyrene
27. 1,10;2,3;5,6;7,8 Octaselenopyrene
28. 3,4 Diselenoperylene
29. 3,4;9,10 Tetraselenoperylene
30. 5,6 Diselenotetracene
31. 5,6;11,12 Tetraselenotetracene
32. Hexaselenoanthracene
33. Hexaselenopentacene
34. Triselenoanthracene
35. Triselenopentacene
36. 1,8 Ditelluronaphthalene
37. 1,8;4,5 Tetratelluronaphthalene
38. 1,9 Ditelluroanthracene
39. 1,9;5,10 Tetratelluroanthracene
40. 1,9;4,10 Tetratelluroanthracene
41. 1,10 Ditelluropyrene
42. 1,10;5,6 Tetratelluropyrene
43. 1,10;2,3 Tetratelluropyrene
44. 1,10;2,3;5,6 Hexatelluropyrene
45. 1,10;2,3;5,6;7,8 Octatelluropyrene
46. 3,4 Ditelluroperylene
47. 3,4;9,10 Tetratelluroperylene
48. 5,6 Ditellurotetracene
49. 5,6;11,12 Tetratellurotetracene
50. Hexatelluroanthracene
51. Hexatelluropentacene
52. Tritelluroanthracene
53. Tritelluropentacene
54. 2,9 Dimethyl-5,6;11,12 Tetrathiotetracene
55. 2,9 Diphenyl-5,6;11,12 Tetrathiotetracene Typical semiconductors which belong to the herein described general class are set forth in the following Table II.

TABLE II

| Cation or Electron Donating Moiety Derived From Compound No. | Anion or Electron Accepting Moiety |
|---|---|
| 14 | Thiocyante |
| 14 | Bromide |
| 14 | Nitrate |
| 14 | Fluoroborate |
| 14 | Sulfate |
| 14 | Ferricyanide |
| 21 | Molybdate |
| 23 | Tungstate |
| 25 | Benzoate |
| 13 | Phthalate |
| 11 | Terephthalate |
| 3 | Pyromellitate |
| 9 | Sulfonate |
| 15 | p-Toluenesulfonate |
| 17 | 2-Naphthoate |
| 23 | 2-Naphthalenesulfonate |
| 29 | 2,3-Naphthalenesulfonate |
| 34 | 1,4,5,8-Naphthalenetetra-carboxylate acetate |
| 19 | Citrate |
| 23 | Gallate |
| 35 | Methoxyacetate |
| 1 | Dichloroacetate |
| 3 | Acrylate |
| 14 | Maleate |
| 14 | Fumarate |
| 14 | Acetylenedicarboxylate |
| 14 | Oxalate |
| 19 | Muconate |
| 23 | 1-Naphthol-3,6-disulfonate |
| 27 | Barbiturate |
| 25 | Cyanurate |
| 30 | 2-Thiobarbiturate |
| 32 | Quinolinate |
| 34 | Cholidonate |
| 28 | 2,5-Dichloro-3,6-dihydroxy-p-benzoquinone |
| 26 | Poly(vinyl mothyl ether-maloic anhydride) |
| 14 | Polyacrylic acid |
| 12 | Sulfonated polystyrene |
| 10 | Poly(menthyl mothacrylate-methacrylic acid) |
| 11 | Poly(ethylene-maloic acid) |
| 15 | Poly(ethyl acrylate-acrylic acid) |

Semiconductor elements can be prepared with the semiconductors described herein by blending a solution of the semiconductor together with a binder, when necessary or desirable, and coating on or imbibing into a suitable substrate or forming a self-supporting layer. Evaporation of the solvent produces a coating in which the conducting species is dispersed in the polymeric binder. It is also possible to coat a soluble derivative of an insoluble semiconducting material, and then regenerate the latter by heating or chemical treatment of the coating. Another method useful for producing conducting coatings of complex organic semiconductors is by successive applications of donor and acceptor layers, the semiconductor being formed in the vicinity of the interface. This is also accomplished if the first component of the semiconductor is coated and then exposed to a vapor of the second species. A polymeric acceptor may be coated from a solvent with or without additional polymeric binder and then by overcoating with a soluble derivative of the donor, a semiconducting polymer is obtained.

Preferred binders for use in preparing the semiconductor elements are generally film-forming materials. Materials of this type comprise natural as well as synthetic materials. Typical of these materials are:

I. Natural resins including gelatin, cellulose ester derivatives such as alkyl esters of carboxylated cellulose, hydroxy ethyl cellulose, carboxy methyl cellulose, carboxy methyl hydroxy ethyl cellulose, etc.;

II. Vinyl resins including a. polyvinyl esters such as vinyl acetate resin, a coplymer of vinyl acetate and crotonic acid, a copolymer of vinyl acetate with an ester of vinyl alcohol and a higher aliphatic carboxylic acid such as lauric acid or stearic acid, polyvinyl stearate, a copolymer of vinyl acetate and maleic acid, a poly(vinylhaloarylate) such as poly(vinyl-m-bromobenzoate), a terpolymer of vinyl butyral with vinyl alcohol and vinyl acetate, a terpolymer of vinyl formal with vinyl alcohol and vinyl acetate, etc.;

b. vinyl chloride and vinylidene chloride polymers such as a poly(vinylchloride), a copolymer of vinyl chloride and vinyl isobutyl ether, a copolymer of vinylidene chloride and acrylontrile, a terpolymer of vinyl chloride, vinyl acetate and vinyl alcohol, poly(vinylidene chloride) a terpolymer of vinyl chloride, vinyl acetate and maleic anhydride, a copolymer of vinyl chloride and vinyl acetate, etc.;

c. styrene polymers such as polystyrene, a nitrated polystyrene, a copolymer of styrene and monoisobutyl maleate, a copolymer of styrene with methacrylic acid, a copolymer of styrene and butadiene, a copolymer of dimethylitaconate and styrene, polyethylstyrene, etc.;

d. methacrylic acid ester polymers such as a poly(alkylmethacrylate), etc.;

e. polyolefins such as chlorinated polyethylene, chlorinated polypropylene, etc.;

f. poly(vinyl acetals) such as a poly(vinyl butyral), etc.; and g. poly(vinyl alcohol);

III. Polycondensates including a. a polyester of 1,3-disulfobenzene and 2,2-bis-(4-hydroxyphenyl)propane;

b. a polyester of diphenyl-p,p'-disulphonic acid and 2,2-bis(4-hydroxyphenyl)propane;

c. a polyester of 4,4'-dicarboxyphenyl ether and 2,2-bis(4-hydroxyphenyl)propane;

d. a polyester of 2,2-bis(4-hydroxyphenyl)propane and fumaric acid;

e. pentaerythrite phthalate;

f. resinous terpene polybasic acid;

g. a polyester of phosphoric acid and hydroquinone;

h. polyphosphites;

i. polyester of neopentylglycol and isophthalic acid;

j. polycarbonates including polythiocarbonates such as the polycarbonate of 2,2-bis(4-hydroxyphenyl)propane;

k. polyester of isophthalic acid, 2,2-bis-4-(β-hydroxyethoxy)phenyl propane and ethylene glycol;

l. polyester of terephthalic acid, 2,2-bis-4-(β-hydroxyethoxy)phenyl and ethylene glycol;

m. polyester of ethylene glycol, neopentyl, glycol, terephthalic acid and isophthalic acid;

n. polyamides;

o. ketone resins; and p. phenolformaldehyde resins;

IV. Silicone resins;

V. Alkyd resins including styrene-alkyd resins, silicone-alkyd resins, soya-alkyd resins, etc.; and VI. Polyamides.

Solvents of choice for preparing coating compositions of the present invention can include a number of solvents such as alcohols including aliphatic alcohols preferably having one to eight carbon atoms including methanol, ethanol, propanol, isopropanol, etc., aromatic alcohols, polyhydric alcohols, substituted alcohols including 2-methoxyethanol, organic carboxylic acids having one to 10 carbon atoms such as formic, acetic, propionic, etc., substituted carboxylic acids, lower dialkylsulfoxides such as dimethylsulfoxide, and water. Also included are mixtures of these solvents among themselves or with other organic solvents such as ketones including acetone, 2-butanone, methylisobutylketone, cyclohexanone, etc., and esters derived from organic carboxylic acids having one to 10 carbon atoms.

In preparing the coatings useful results are obtained where the semiconductor is present in an amount equal to at least about 1 weight percent of the coating. The upper limit in the amount of semiconductor present can be widely varied in accordance with usual practice. In those cases where a binder is employed, it is normally required that the semiconductor be present in an amount from about 1 weight percent of the coating to about 99 weight percent of the coating. A preferred weight range for the semiconductor in the coating is from about 10 weight percent to about 60 weight percent.

Coating thicknesses of the semiconductor composition on a support can vary widely. Normally, a coating in the range of about 0.0001 inch to about 0.01 inch before drying is useful for the practice of this invention. The preferred range of coating thickness is in the range from about 0.0002 inch to about 0.0008 inch before drying although useful results can be obtained outside of this range.

Suitable substrates for coating the semiconductor-containing elements can include any of a wide variety of supports, for example, fibers, films, glass, paper, metals, etc.

Because of their chemical and physical properties, the organic semiconductors described herein are readily incorporated into thin films having a surface resistivity of less than $10^{11}$ ohm/square. This resistivity is substantially independent of relative humidity and remains within this range even in vacuum. As a result of the aforementioned good electrical properties, these films are useful in preparing a number of articles of manufacture. For example, one such use is in an anti-static photographic film element comprising an inert film support (which may carry a subbing layer to improve adhesion), a conducting layer containing one of the organic semiconductors described herein and a silver halide emulsion layer which is sensitive to electromagnetic radiation. These layers can be arranged having the conducting layer and the emulsion layer on each side of the support, and also both layers can be on the same side, with either one on top of the other. In some cases, it is desirable to include additional layers of insulating polymer which can be incorporated into the element, either below, between or above any of the above-mentioned layers.

Another use is in anti-static magnetic tape, comprising the same arrangement of layers as in the above-described photographic film element, with the exception that the photographic emulsion is replaced by a suitable layer of magnetic material.

A further use is in a direct electron recording film element comprising an inert insulating film support (which may carry a subbing layer to improve adhesion), a conducting layer containing one of the organic semiconductors described herein and a layer of a silver halide emulsion which is sensitive to electron beams. In this case, both layers are placed on one side of the support with either one on top of the other. Also, additional layers of insulating polymer may be incorporated, as in the preceding elements, to provide particular advantage such as improvement of adhesion, elimination of undesirable changes in the electron-sensitivity of the emulsion, etc.

A fourth use is in electrophotographic elements, comprising a conducting layer which contains one of the organic semiconductors described herein. The conducting layer is coated on an inert support, and on top of the conducting layer is a second layer containing a photoconductor. Additional thin layers of insulating polymers may also be included in this case, as in the preceding elements, which may be located below, between or on top of the conducting and photoconducting layers.

Another use is in the preparation of optically transparent conducting elements. These elements have a conducting layer containing an organic semiconductor described herein applied to an insulating inert support. The thickness of the conducting layer is such that the resultant optical density is not more than about 0.5 in the spectral range from 400 to 800 nm. Such an element is used in the manufacture of anti-static windows for electronic instruments, anti-static lenses for cameras, and other optical devices, transparent heating panels, photographic products, etc.

Static-free woven goods also can contain the organic semiconductors described herein. Fibers containing the organic semiconductors can be incorporated in woven goods as the sole component or mixed with non-conducting fibers.

In electronic components, the organic semiconductors can be applied to an insulating support and shaped in any desired way to give passive electronic components such as resistors or capacitors. Also, the organic semiconductors can be incorporated as part of active components such as rectifiers or transistors.

The semiconductors described herein are generally prepared by reacting a soluble derivative of one of the substituted polycyclic aromatic hydrocarbons, such as tetrathiotetracene acetate, with either 1) an anion furnishing inorganic material such as an inorganic salt or acid, 2) an anion furnishing organic material such as an organic acid or salt or 3) an anionic polymer. Typical preparations are set forth below.

EXAMPLE 1

Preparation of Tetrathiotetracene Bromide

A solution of tetrathiotetracene acetate (about 0.8 g in 200 ml of water) was added to a solution of 0.18 g of sodium bromide in 100 ml of water. Tetrathiotetracene bromide precipitated as a red solid, is recovered by filtration, and dried at 120°C. for 24 hours.

EXAMPLE 2

Preparation of Tetrathiotetracene Maleate

An aqueous solution of tetrathiotetracene acetate (approx. 0.6 g in 90 ml of water) is mixed with an aqueous solution containing 0.5 g of maleic acid. A red insoluble solid precipitates out. This solid is separated by filtration, washed with water and dried for four days at 120°C.

EXAMPLE 3

Preparation of Tetrathiotetracene-Sulfonated Polystyrene Complex

An aqueous solution of tetrathiotetracene acetate (20 ml) containing 5.32 mg of tetrathiotetracene per ml is mixed with 5 ml of a solution containing 1 g of sulfonated poly-(styrene) in 100 ml of water. A red solid precipitates out. It is filtered, washed with water, and dried in vacuum for one day.

As explained previously, there are several techniques for preparing elements containing the organic semiconductors of this invention. Representative preparations are set forth in the following Examples.

EXAMPLE 4

When the organic semiconductor is soluble in a suitable solvent (either water or an organic solvent), a humidity-independent electrically conducting coating can be prepared by applying a solution of the organic semiconductor, with an inert polymeric binder, to a support, followed by evaporation of the solvent. A solution of tetrathiotetracene acetate in water, containing approximately 10 mg of tetrathiotetracene acetate per ml and 5 mg of gelatin per ml is applied to a subbed polyester support on a whirler plate. The film is dried briefly with hot air, and pink coating obtained. In this example the conducting species is tetrathiotetracene acetate.

EXAMPLE 5

When the conducting material is not soluble in the desired solvent, but soluble derivatives are suitable, conducting coatings can be prepared by coating these soluble derivatives as above, then regenerating the conducting material by treating these coatings with heat or suitable chemicals. An aqueous solution of tetrathiotetracene acetate containing 5.95 mg of tetrathiotetracene per ml and 3.5 mg of poly(vinyl alcohol) per ml was applied to a subbed polyester support at such a rate that a coverage of 9.54 mg of tetrathiotetracene per square foot is obtained. The film is dried briefly with hot air and a pink coating of tetrathiotetracene acetate is obtained. This is subsequently cured in an oven at 120°C. for 3 minutes. A green coating is obtained. In this example the conducting species is regenerated tetrathiotetracene.

EXAMPLE 6

The regeneration of the desired conducting species can also be accomplished by chemical reaction instead of by the action of heat alone. the coated material can be exposed to a solution containing a suitable chemical reducing agent, such as an alkaline material e.g. sodium hydroxide, potassium hydroxide, ammonium hydroxide, sodium sulfite, sodium hyposulfite, etc.; or to its vapor, or a second solution containing the reducing agent can be overcoated on the first one. A coating of tetrathiotetracene acetate dispersed in a poly(vinyl alcohol) is prepared as in Example 4. The pink coating is overcoated with a 0.56 percent solution of ammonium hydroxide in water. A green coating is obtained. The conducting species is tetrathiotetracene.

EXAMPLE 7

When the conducting material is not soluble in the desired solvent, but it is formed by reaction of two soluble substances, these substances can be coated successively and the active material is obtained by reaction at or near the interface between the two coatings. A coating of tetrathiotetracene acetate is prepared as described in Example 5, obtaining a coverage of 2.34 mg of tetrathiotetracene per square foot. The dry pink coating is then overcoated with a solution of sodium bromide in water (7.34 mg/ml), containing also 5.33 mg/ml of poly(vinyl alcohol), in such a way that a coverage of 3.92 mg of sodium bromide per square foot is obtained. The solvent is evaporated with hot air. The color of the coating is pink, and it remains the same after curing in an oven at 120°C. for 1.5 minutes. Tetrathiotetracene bromide is formed at the interface.

EXAMPLE 8

The same method is used as in Example 7, but a solution of maleic acid containing 15 mg/ml is used instead of the sodium bromide solution, still using the same polymeric binder. The coating is cured at 120°C. for 1.5 minutes. The semiconducting species is tetrathiotetracene maleate.

EXAMPLE 9

The methods of Example 7 and 8 can be modified if the time lag between the mixing of the reagents and the precipitation of the insoluble product is no shorter than several minutes. In this case, the solutions containing the parent materials can be mixed just prior to coating and this metastable mixture coated onto the support as in Example 4 or 5. The mixing can be accomplished in several alternative ways: mixing in a common vessel, dynamic mixing in a tube feeding into a low hold-up hopper, direct mixing in a hopper with or without stirring in the hopper cavity, wet-on-wet coating, etc. In this instance, a solution of tetrathiotetracene acetate (approximately 0.8 g in 200 ml of water) is added to a solution of 0.2 g of sodium iodide in 100 ml of water. The insoluble tetrathiotetracene iodide precipitates as a violet solid, and a violet metastable solution is recovered after filtration. The solution is coated immediately without any polymeric binder on a subbed polyester support and dried in an oven at 120°C for about 15 minutes. A violet coating is obtained. The conducting species in this example was tetrathiotetracene iodide.

EXAMPLE 10

A conducting coating having a complex as the functional species can also be prepared by coating one of the components and then exposing this coating (dry or wet) to the vapors of the second reagent, the desired reaction taking place then without need of a second coating. Regeneration of an insoluble organic semiconductor can also be accomplished in this way if the regenerating chemical can be obtained in the form of vapors. A coating of tetrathiotetracene acetate prepared as in Example 5 is passed through an oven containing vapors of maleic acid at 120°C. The total exposure to the vapors is 1.5 minutes. A pink coating is obtained, the conducting species being the tetrathiotetracene-maleic acid complex.

EXAMPLE 11

A conducting coating can be formed by coating a film-forming conducting species directly on a support without a polymeric binder. The conducting species can also be incorporated by imbibition into a subbing layer already coated on the support and soluble or softened by the coating solvent. An aqueous solution of poly(vinyl methyl ether-maleic acid) containing 15 mg/ml of the polymer is coated on a subbed polyester support on a whirler plate and dried briefly with hot air. An aqueous solution of tetrathiotetracene acetate, containing 1.6 mg of tetrathiotetracene per ml, is then coated onto the first layer and dried. A red coating is obtained which is a complex of the polymer and the tetrathiotetracene.

EXAMPLE 12

As discussed previously, it has been found that the electrical conduction takes place in these coatings of organic semiconductors by a mechanism involving transfer of electrons and/or positive holes, but independent of relative humidity and not based on the migration of ionic species. The purpose of this example is to demonstrate this phenomena. A coating is prepared as in Example 7 but using sodium iodide instead of sodium bromide. A violet coating is obtained which shows a thin-film resistivity of approximately $2 \times 10^7$ ohm/sq when measured in a high vacuum (pressure $= 1.5 \times 10^5$ mm of mercury). A voltage of 160 volts D.C. is applied continuously to the coated sample for 19 days, with a current flow between 7.95 and 9.25 microamperes. If the conduction had occurred by ionic migration, the total charge passed through the sample over this period of time would have required the presence of about one thousand times more ions than were actually present in the coated area. The fact that no substantial decrease in the current flow is observed indicates that electronic conduction by either electron and/or positive hole migration is the mechanism responsible for the current flow.

EXAMPLE 13

A 23 percent solution of poly(ethylacrylate-acrylic acid) in acetone is poured on an unsubbed polyester support and spun on a whirler until partially dry. Then a solution of tetrathiotetracene acetate in methanol is poured on top of the layer of partially dry polymer. The material is dried in a vacuum for 4 hours. The red polymeric film is peeled off the support, and a conducting free film is thereby obtained.

EXAMPLE 14

Because of the good solubility of many of the materials described herein, thin films containing these materials which show humidity-independent electrical conduction and have relatively little optical density are prepared. The surface resistivity of these films is measured by applying painted graphite electrodes on the surface of the film and measuring the resistacne with a Keithley 610B electrometer. The results resistance set forth in Table III.

TABLE III

CONDUCTING COATINGS

| Conducting Species (a). | Surface Resistivity (ohms/square) |
|---|---|
| TTT-iodide | $2.0 \times 10$ |
| TTT-maleate | $5.9 \times 10^8$ |
| TTT-phthalate | $4.2 \times 10^8$ |

(a) TTT represents a tetrathiotetracene moiety.

From the above Examples it is seen that the organic semiconductors described herein can be made having various electrical properties. As such, the specific semiconductor used for a particular application, is dependent upon what electrical properties are desired. Accordingly, the semiconductor can be tailor-made to fit the intended purpose.

The invention has been described in detail with particular reference to preferred embodiments thereof, but it will be understood that variations and modifications can be effected within the spirit and acope of the invention.

I claim:

1. An image recording element comprising a support containing a layer of a silver halide emulsion and a layer comprising a semiconductor having the formula:

$$(D)_k^{\circ}(D^{+n})_m(Z^{-p})_q$$

wherein:

D is a fused polycyclic aromatic hydrocarbon having at least two positions joined by a bridge containing two to four atoms of a Group VI*a* element;

Z is one or more anions selected from the group consisting of:

a. an inorganic anion;

b. a monomeric organic anion derived from a monomeric organic acid selected from the group consisting of: an aliphatic monocarboxylic acid, an aliphatic dicarboxylic acid, an aliphatic polycarboxylic acid, an unsaturated carboxylic acid, an aromatic carboxylic acid, a sulfonic acid, a heterocyclic acid containing from 5 to 6 atoms in the heterocyclic nucleus and having at least one hetero atom selected from the group consisting of a nitrogen, oxygen, or sulfur atom; a monohydric phenol, and a polyhydric phenol; and c. a polymeric anion derived from an anion-furnishing organic polymer;

−p is the negative charge on each Z anion;

$q$ is the number of Z anions and has a value of 1 to 6;

$(D)^{\circ}$ is a combined neutral D moiety;

$+n$ is the charge on each D cation moiety;

$m$ represents the number of D cation moieties and has a value of 1 to 6;

$k$ represents the number of D neutral moieties and has a value of 0 to 5;

the relationship between $+n$, $m$, $-p$ and $q$ being such that $nm$ is equal to $pq$.

2. An electrophotographic element comprising a support containing a layer of a photoconducting composition and a conducting layer comprising a semiconductor having the formula:

$$(D)_k^{\circ}(D^{+n})_m(Z^{-p})_q$$

wherein:

D is a fused polycyclic aromatic hydrocarbon having at least two positions joined by a bridge containing two to four atoms of a Group VIa element;

Z is one or more anions selected from the group consisting of:

a. an inorganic anion;

b. a monomeric organic anion derived from a monomeric organic acid selected from the group consisting of: an aliphatic monocarboxylic acid, an aliphatic dicarboxylic acid, an aliphatic polycarboxylic acid, an unsaturated carboxylic acid, an aromatic carboxylic acid, a sulfonic acid, a heterocyclic acid containing from five to six atoms in the heterocyclic nucleus ahd having at least one hetero atom selected from the group consisting of a nitrogen, oxygen, or sulfur atom; a monohydric phenol, and a polyhydric phenol; and c. a polymeric anion derived from an anion-furnishing organic polymer;

−p is the negative charge on each Z anion;

$q$ is the number of Z anions and has a value of 1 to 6;

$(D)^{\circ}$ is a combined neutral D moiety;

$+n$ is the charge on each D cation moiety;

$m$ represents the number of D cation moieties and has a value of 1 to 6;

$k$ represents the number of D neutral moieties and has a value of 0 to 5;

the relationship between $+n$, $m$, −p and $q$ being such that $nm$ is equal to $pq$.

3. A process for preparing a semiconductor element containing a layer of semiconductor having the formula:

$$(D)_k^{\circ}(D^{+n})_m(Z^{-p})_q$$

wherein:

D is a fused polycyclic aromatic hydrocarbon having at least two positions joined by a bridge containing two to four atoms of a Group VIa element;

Z is one or more anions selected from the group consisting of: polycarboxylic a. an inorganic anion;

b. a monomeric organic anion derived from a monomeric organic acid selected from the group consisting of: an aliphatic monocarboxylic acid, an aliphatic dicarboxylic acid, an aliphatic polycarbonxylic acid, an unsaturated carboxylic acid, an aromatic carboxylic acid, a sulfonic acid, a heterocyclic acid containing from five to six atoms in the heterocyclic nucleus and having at least one hetero atom selected from the group consisting of a nitrogen, oxygen, or sulfur atom; a monohydric phenol, and a polyhydric phenol; and c. a polymeric anion derived from an anion-furnishing organic polymer;

−p is the negative charge on each Z anion;

$q$ is the number of Z anions and has a value of 1 to 6;

$(D)^{\circ}$ is a combined neutral D moiety;

$+n$ is the charge on each D cation moiety;

$m$ represents the number of D cation moieties and has a value of 1 to 6;

$k$ represents the number of D neutral moieties and has a value of 0 to 5;

the relationship between $+n$, $m$, $-p$ and q being such that $nm$ is equal to $pq$; comprising the steps of a. providing a supporting substrate, b. applying a composition comprising a solution of said semiconductor in a solvent onto the substrate and c. evaporating the solvent.

4. A process for preparing a semiconductor element containing a layer of a semiconductor having the formula:

$$(D)_k^{\circ}(D^{+n})_m(Z^{-p})_q$$

wherein:

D is a fused polycyclic aromatic hydrocarbon having at least two positions joined by a bridge containing two to four atoms of a Group VI*a* element;

Z is one or more anions selected from the group consisting of:

a. an inorganic anion;

b. a monomeric organic anion derived from a monomeric organic acid selected from the group consisting of: an aliphatic monocarboxylic acid, an aliphatic dicarboxylic acid, an aliphatic polycarboxylic acid, an unsaturated carboxylic acid, an aromatic carboxylic acid, a sulfonic acid, a heterocyclic acid containing from five to six atoms in the hetercyclic nucleus and having at least one hetero atom selected from the group consisting of a nitrogen, oxygen, or sulfur atom; a monohydric phenol, and a polyhydrica phenol; and c. a polymeric anion derived from an anion-furnishing organic polymer; p1 $-p$ is the negative charge on each Z anion;

$q$is the number of Z anions and has a value of 1 to 6;

$(D)^{\circ}$ is a combined neutral D moiety;

$+n$ is the charge on each D cation moiety;

$m$ represents the number of D cation moieties and has a value of 1 to 6;

$k$ represents the number of D neutral moieties and has a value of 0 to 5;

the relationship between $+n$, $m$, $-p$ and $q$ being such that $nm$ is equal to $pq$; comprising the steps of a. providing a supporting substrate;

b. applying to the substrate a first layer comprising a solution of a soluble salt of a fused polycyclic aromatic hydrocarbon as defined by D above and
c. applying to said first layer a second layer comprising a solution of a compound from which anion Z is derived thus forming said semiconductor at the interface between the two layers.

5. A process for preparing a semiconductor element containing a layer of a semiconductor having the formula:

$$(D)_k{}^\circ(D^{+n})_m(Z^{-p})_q$$

wherein:

D is a fused polycyclic aromatic hydrocarbon having at least two positions joined by a bridge containing two to four atoms of a Group VI*a* element;
Z is one or more anions selected from the group consisting of:
a. an inorganic anion;
b. a monomeric organic anion derived from a monomeric organic acid selected from the group consisting of: an aliphatic monocarboxylic acid, an aliphatic dicarboxylic acid, an aliphatic polycarboxylic acid, an unsaturated carboxylic acid, an aromatic carboxylic acid, a sulvonic acid, a heterocyclic acid containing from five to six atoms in the heterocyclic nucleus and having at least one hetero atom selected from the group consisting of a nitrogen, oxygen, or sulfur atom; a monohydric phenol, and a polyhydric phenol; and
c. a polymeric anion derived from an anion-furnishing organic polymer;
$-p$ is the negative charge on each Z anion;
$q$ is the number of Z anions and has a value of 1 to 6;
$(D)^\circ$ is a combined neutral D moiety;
$+n$ is the charge on each D cation moiety;
$m$ represents the number of D cation moieties and has a value of 1 to 6;
$k$ represents the number of D neutral moieties and has a value of 0 to 5;
the relationship between $+n$, $m$, $-p$ and q being such that $nm$ is equal to $pq$; comprising the steps of
a. providing a supporting substrate,
b. applying to the substrate a first layer comprising a solution of a compound from which anion Z is derived and
c. applying to the first layer a second layer comprising a solution of a soluble salt of a fused polycyclic aromatic hydrocarbon as defined by D above thus forming said semiconductor at the interface between the two layers.

6. A process for preparing a semiconductor element containing a layer of a semiconductor having the formula:

$$(D)_k{}^\circ(D^{+n})_m(Z^{-p})_q$$

wherein:

D is a fused polycyclic aromatic hydrocarbon having at least two positions joined by a bridge containing two to four atoms of a Group VI*a* element;
A is one or more anions selected from the group consisting of:
a. an inorganic anion;
b. a monomeric organic anion derived from a monomeric organic acid selected from the group consisting of: an aliphatic monocarboxylic acid, an aliphatic dicarboxylic acid, an aliphatic polycarbonxylic acid, an unsaturated carboxylic acid, an aromatic carboxylic acid, a sulvonid acid, a heterocyclic acid containing from five to six atoms in the hetercyclic nucleus and having at least one hetero atom selected from the group consisting of a nitroge, oxygen, or sulfur atom; a monohydric phenol, and a polyhydrica phenol; and
c. a polymeric anion derived from an anion-furnishing organic polymer;
$-p$ is the negative charge on each Z anion;
$q$ is the number of Z anions and has a value of 1 to 6;
$(D)^\circ$ is a combined neutral D moiety;
$+n$ is the charge on each D cation moiety;
$m$ represents the number of D cation moieties and has a value of 1 to 6;
$k$ represents the number of D neutral moieties and has a value of 0 to 5;
the relationship between $+n$, $m$, $-p$ and $q$ being such that $nm$ is equal to $pq$;
comprising the steps of
a. providing a supporting substrate,
b. applying to the substrate a layer comprising a solution of a soluble salt of a fused polycyclic aromatic hydrocarbon as defined by D above and
c. exposing said layer to the vapors of a compound from which anion Z is derived
thus froming said semiconductor on the surface of the subrate.

7. A process for preparing a semiconductor element containing a layer of a semiconductor having the formula:

$$(D)_k{}^\circ(D^{+n})_m(Z^{-p})_q$$

wherein:

D is a fused polycyclic aromatic hydrocarbon having at least two positions joined by a bridge containing two to four atoms of a Group VIa element;
Z is a polymeric anion derived from an anion-furnishing organic polymer;
$-p$ is the negative charge on each Z anion;
$q$ is the number of Z anions and has a value of 1 to 6;
$(D)^\circ$ is a combined neutral D moiety;
+n is the charge on each D cation moiety;
$m$ represents the number of D cation moieties and has a value of 1 to 6;
$k$ represents the number of D neutral moieties and has a value of 0 to 5;
the relationship between $+n$, $m$, $-p$ and $q$ being such that $nm$ is equal to $pq$;
comprising the steps of
a. providing a supporting substrate which is an anionic polymer from which anion Z is derived and
b. applying to the substrate a solution of a soluble salt of a fused polycyclic aromatic hydrocarbon as defined by D above
thus forming said semiconductor on said substrate.

8. A process for preparing a semiconductor element containing a fused polycyclic aromatic hydrocarbon having at least two positions joined by a bridge containing two to four atoms of a Group VI*a* element comprising the steps of
a. providing a supporting substrate, b. applying to the substrate a material having the formula:

$(D)_k^{\circ}(D^{+n})_m(Z^{-p})_q$ wherein:

D is a fused polycyclic aromatic hydrocarbon having at least two positions joined by a bridge containing two to four atoms of a Group VI*a* element;

Z is one or more anions selected from the group consisting of:

a. an inorganic anion;

b. a monomeric organic anion derived from a monomeric organic acid selected from the group consisting of: an aliphatic monocarboxylic acid, an aliphatic dicarboxylic acid, an aliphatic polycarboxylic acid, an unsaturated carboxylic acid, an aromatic carboxylic acid, a sulfonic acid, a heterocyclic acid containing from five to six atoms in the heterocyclic nucleus and having at least one hetero atom selected from the group consisting of a nitrogen, oxygen, or sulfur atom; a monohydric phenol, and a polyhydric phenol; and c. a polymeric anion derived from an anion-furnishing organic polymer;

$-p$ is the negative charge on each Z anion;

$q$ is the number of Z anions and has a value of 1 to 6;

$(D)^{\circ}$ is a combined neutral D moiety;

$+n$ is the charge on each D cation moiety;

$m$ represents the number of D cation moieties and has a value of 1 to 6;

$k$ represents the number of D neutral moieties and has a value of 0 to 5;

the relationship between +n, m, −p, and q being such that nm is equal to pq and c. heating the element to a temperature sufficient to decompose said material thereby producing said fused polycyclic aromatic hydrocarbon as a decomposition product.

9. A process for preparing a semiconductor element containing a fused polycyclic aromatic hydrocarbon having at least two positions joined by a bridge containing two to four atoms of a Group VIa element comprising the steps of a. providing a supporting substrate, b. applying to the substrate a material having the formula:

$$(D)_k^{\circ}(D^{+n})_m(Z^{-p})_q$$

wherein:

D is a fused polycyclic aromatic hydrocarbon having at least two positions joined by a bridge containing two to four atoms of a Group VIa element;

Z is one or more anions selected from the group consisting of:

a. an inorganic anion;

b. a monomeric organic anion derived from a monomeric organic acid selected from the group consisting of: an alphatic monocarboxylic acid, an aliphatic dicarboxylic acid, an aliphatic polycarboxylic acid, an unsaturated carboxylic acid, an aromatic carboxylic acid, a sulfonic acid, a heterocyclic acid containing from five to six atoms in the heterocyclic nucleus and having at least one hetero atom selected from the group consisting of a nitrogen, oxygen, or sulfur atom; a monohydric phenol, and a polyhydric phenol; and c. a polymeric anion derived from an anion-furnishing organic polymer;

$-p$ is the negative charge on each Z anion;

$q$ is the number of Z anions and has a value of 1 to 6;

$(D)^{\circ}$ is a combined neutral D moiety;

$+n$ is the charge on each D cation moiety;

$m$ represents the number of D cation moieties and has a value of 1 to 6;

$k$ represents the number of D neutral moieties and has a value of 0 to 5;

the relationship between $+n$, $m$, $-p$, and $q$ being such that nm is equal to $pq$ and c. treating the element with a reducing agent thereby producing said fused polycyclic aromatic hydrocarbon.

10. $(D)_k^{\circ}(D^{+n})_m(Z^{-p})_q$ wherein:

D is a fused polycyclic aromatic hydrocarbon having at least two positions joined by a bridge containing two to four atoms of a Group VIa element;

Z is selected from the group consisting of a thiocyanate group, a tetrafluoroborate group, a sulfate group, a ferricyanice group, a molybdate group, a tungstate group, a gallate group, an anion derived from a monomeric organic acid having at least 3 carbon atoms, anions derived from anion-furnishing organic polyerms and mixtures thereof;

$-p$ is the negative charge on each Z anion;

$q$ is the number of Z anions and has a value of 1 to 6;

$(D)^{\circ}$ is a combined neutral D moiety;

$+n$ is the charge on each D cation moiety;

$m$ represents the number of D cation moieties and has a value of 1 to 6;

$k$ represents the number of D neutral moieties and has a value of 0 to 5;

the relationship between $+n$, $m$, $-p$ and $q$ being such that $nm$ is equal to $pq$.

11. Tetrathiotetracene citrate

12. Tetrathiotetracene phthalate

13. Tetrathiotetracene dichloroacetate

14. Tetrathiotetracene poly(vinyl methyl ethermaleic anhydride).

* * * * *

PO-1050
(5/69)

UNITED STATES PATENT OFFICE
CERTIFICATE OF CORRECTION

Patent No. 3,754,986 Dated August 28, 1973

Inventor(s) Evelio A. Perez-Albuerne

It is certified that error appears in the above-identified patent and that said Letters Patent are hereby corrected as shown below:

Column 15, line 36, "ahd" should read --and--; line 65, "polycarboxylic" should be deleted. Column 16, lines 3-4, "polycarbonxylic" should read --polycarboxylic--; line 53, "polyhydrica" should read --polyhydric--; line 56, "pl" should be deleted. Column 17, line 25, "sulvonic" should read --sulfonic--; line 63, "A" should read --Z--. Column 18, line 3, "carbonxylic" should read --carboxylic--; line 4, "sulvonid" should read --sulfonic--; line 8, "nitroge" should read --nitrogen--; line 9, "polyhydrica" should read --polyhydric--; line 31, "froming" should read --forming--; line 32, "subrate" should read --substrate--. Column 20, line 2, "alphatic" should read --aliphatic--; line 36, "ferricyanice" should read --ferricyanide--; line 40, "polyerms" should read --polymers--.

Signed and sealed this 1st day of October 1974.

(SEAL)
Attest:

McCOY M. GIBSON JR.
Attesting Officer

C. MARSHALL DANN
Commissioner of Patents